Feb. 9, 1954

R. N. JANEWAY 2,668,505

ROCKER BLOCK AXLE MOUNTING

Filed Aug. 21, 1948

FIG. 1.
Rigid Wheel Base.
Leading Axle Displaced Laterally.
Stable Condition.

FIG. 2.
Rigid Wheel Base.
Trailing Axle Displaced Laterally.
Unstable Condition.

FIG. 3.
Axle With Longitudinal Freedom.
Trailing Axle Displaced
Laterally and Angularly
Stable Condition.

INVENTOR.
Robert N. Janeway.
BY
Harness and Harris
ATTORNEYS.

FIG. 8.

Patented Feb. 9, 1954

2,668,505

UNITED STATES PATENT OFFICE 2,668,505

ROCKER BLOCK AXLE MOUNTING

Robert N. Janeway, Detroit, Mich., assignor to Chrysler Corporation, Highland Park, Mich., a corporation of Delaware Application August 21, 1948, Serial No. 45,481

6 Claims. (Cl. 105—224.1)

This invention relates to railway car trucks and has particular reference to a simplified and improved means for mounting the side frame members on the wheel axles whereby truck nosing and unsquaring of the side frame members are effectively counteracted and the riding qualities of the truck materially improved.

It is a primary object of this invention to mount the wheel axles in the truck side frame members in such a manner that lateral slippage forces will be automatically set up between the wheels and rails, upon any tendency of the truck to nose, which forces will resist and counteract the forces tending to cause nosing.

It is a further object of this invention to prevent nosing of a car truck by mounting the wheel axles in the side frame members in such a manner that the axles may have a positively controlled longitudinal movement relative to the side frame members, which movement is effective to prevent nosing.

It is an additional object of this invention to prevent nosing of a car truck by mounting the wheel axles in the truck frame members in such a manner that the axles may move longitudinally of their mountings, the movement being controlled by a pair of engaged, concentrically arranged curved surfaces which provide gravity action spring devices which automatically center the axles in their frame journal mountings when the nosing tendencies of the truck have been dissipated.

It is a further object of this invention to provide rigid side frame rocker block mountings for the axle bearing assemblies which mountings permit the bearing assemblies to have a positively controlled rolling movement longitudinally of the side frame members which movement resists and counteracts nosing.

It is an additional object of this invention to mount the truck side frame members on the wheel axles by means of rigid load carrying elements that permit controlled longitudinal shift of the axles relative to the frame members, such shifts being positively controlled by gravity spring means which tend to automatically center the axles, and by resilient means that tend to retain the axles and side members in their normally aligned positions.

It is another object of this invention to provide a side frame wheel axle mounting comprising rigid load carrying elements that permit longitudinal shift of the axles yet tend to maintain the axles in a stable condition of equilibrium, such mountings having in combination therewith resilient means that tend to resist any shift of the axles from their normally stable position, the resilient means further serving to resist unsquaring of the side frames.

The nature of this invention will become fully apparent from a reading of the following description and a consideration of the related drawings wherein.

The problem of truck nosing is one of the most troublesome and perplexing encountered in the operation of railroad rolling stock. As commonly observed, nosing consists of a periodic wandering of the car trucks from side to side causing the supported car body to oscillate around a vertical axis at its center of length. Although it is usually associated with coned tread wheels, as will be pointed out below, still, nosing is not necessarily limited to trucks with this type of wheel. The conditions responsible for nosing in conventional trucks appear to be critical and to involve such variables as wheel wear, clearance conditions between the truck frame and wheel axle journal assemblies, and whether power is applied through the truck wheels.

As a result of considerable experimentation it has been established that at least a limited amount of positively controlled longitudinal freedom of movement of the wheel axle bearing assemblies with respect to the supported side frame members is necessary to avoid nosing. Extensive investigations in conjunction with a mathematical analysis of the truck nosing phenomena have established that truck nosing depends primarily on the direction of the steering moment produced by the trailing wheels of a truck unit when these wheels are displaced laterally relative to the track.

In order to understand the phenomena of nosing it is necessary to consider the various forces which are set up between the wheels and the track rails when a set of coned tread wheels become displaced laterally with respect to the tracks. Because of the coned tread of the conventional truck wheels, the lateral displacement of an axle and its pair of supported wheels shifts one of the wheels to a position where a high portion of its coned tread engages the track rail and the other wheel is shifted to a position where a low portion of its coned tread engages the track rail. As a result of such a shift the rolling diameters of the pair of wheels are no longer the same. Accordingly, in maintaining the forward velocity of the truck, one wheel tends to roll ahead of the truck while the other wheel tends to lag behind. This means that longitudinally directed slippage forces are set up at the points of contact between the wheels and the rails, which forces are equal and opposite in direction when the coned conditions of the wheels are identical. When the coned tread of the wheels are different, still, longitudinally extending, oppositely directed, slippage forces will be set up at the points of contact between the wheels and the rails but these forces may differ in magnitude. Thus a slippage couple is always set up, when the wheels are displaced laterally, which tends to turn both the wheels and the supporting axle assembly, as well as the associated truck frame, in a horizontal plane about a vertical axis.

Figure 1:
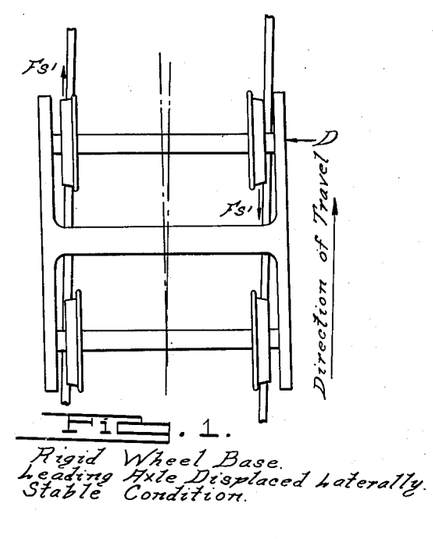
Fig. 1 is a diagrammatic view of a rigid wheel base truck to which an external force has been momentarily applied such that a lateral displacement of the leading axle results.

Fig. 1 of the drawings diagrammatically illustrates the conditions when the leading axle of a truck having rigidly mounted axles has been displaced laterally in the direction of the arrow D as the result of some external force, such as a track irregularity, having been momentarily applied to the truck. The lateral displacement of the leading wheels resulting from an application of such a force creates longitudinally directed slippage forces $F_{s_1}$ at the leading wheels that tend to cause clockwise rotation of the leading portion of the truck about a vertical axis through the trailing axle. Under such conditions the turning moment resulting from the couple caused by the slippage forces $F_{s_1}$ is in the direction opposite to the initial displacement resulting from the momentary application of the external force and the couple of the slippage forces $F_{s_1}$ tends to swing the truck back to its central position relative to the track rails. Under such conditions a relatively stable condition exists that will not tend to produce nosing.

Figure 2:
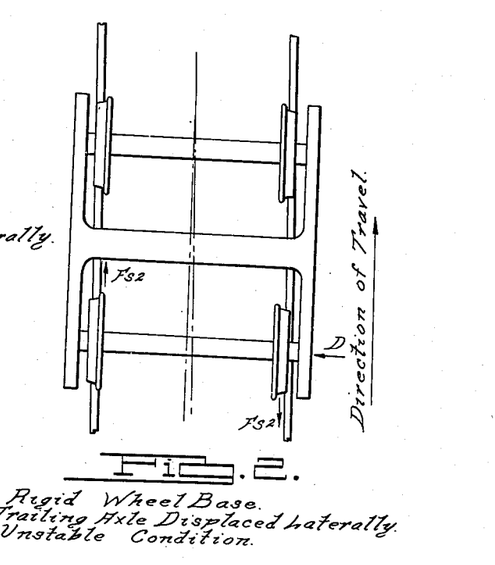
Fig. 2 is a diagrammatic view of a rigid wheel base truck to which an external force has been momentarily applied, such that a lateral displacement of the trailing axle results.

Fig. 2 illustrates the conditions when some external force has been momentarily applied to the rigidly mounted trailing axle of the truck and such a force has caused a lateral displacement of the trailing wheels in the direction of the arrow D. It will be noted that under these conditions displacement of the coned trailing wheels creates a force couple $F_{s_2}$ at the trailing wheels that produces a turning moment tending to rotate the trailing portion of the truck in a clockwise direction about a vertical axis through the leading axle. Under such conditions the force couple resulting from the longitudinally directed slippage forces $F_{s_2}$ causes displacement of the trailing portion of the truck in the same direction as that resulting from the externally applied force and thus the slippage couple tends to further increase the initial lateral displacement and the angularity of the truck with respect to the track rails. The conditions diagrammatically represented in Fig. 2 represent an unstable condition which tends to cause the truck to continue to run off laterally towards the left until the wheel flanges hit the edges of the rails which causes the trailing portion of the truck to then swing back in the opposite lateral direction. With the trailing portion of the truck acted upon by the forces such as those illustrated in Fig. 2, it is obvious that once the lateral oscillatory motion of the trailing portion of the truck begins, it may continue indefinitely and cause the entire truck to wander from side to side in a manner commonly denoted as truck nosing.

Figure 3:
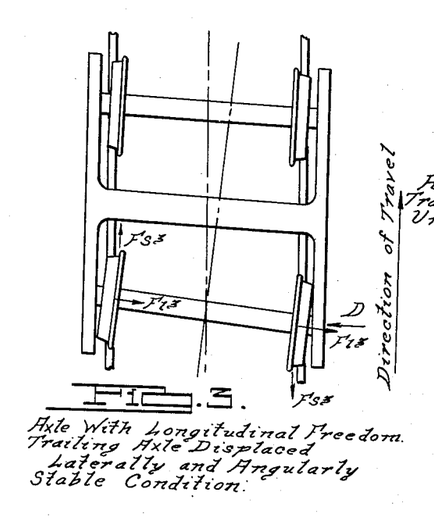
Fig. 3 is a diagrammatic view of a truck in which the axles are mounted so as to permit limited longitudinal movement relative to the truck and to which an external force has been momentarily applied such that a lateral displacement of the trailing axle results.

Figs. 1 and 2 diagrammatically represent the conditions with a rigid wheel base truck where the axles are mounted in the side frame journal openings in such a manner as to cause them to remain substantially parallel to each other and where they are restrained against longitudinal displacement relative to the side frames and each other. Fig. 3 diagrammatically represents a truck having the axles mounted in the side frames such that positively controlled longitudinal movement between the axles and the associated journal openings in the side frames is possible. It will now be explained how it is possible to counteract the nosing tendency of a truck by mounting the wheel axles in the truck side frame members such that the axles may have a positively controlled longitudinal freedom of movement relative to the side frames. As a result of some external force having been momentarily applied to the longitudinally movable trailing axle of the truck shown in Fig. 3, the trailing wheels are displaced laterally in the direction of the arrow D and longitudinally directed slippage forces $F_{s_3}$ are set up at the trailing wheels. These longitudinally directed forces $F_{s_3}$ produce turning moments that tend to rotate the trailing portion of the truck in a clockwise direction about a vertical axis through the leading axle, the same as in the case of the rigid wheel base truck shown in Fig. 2. In addition, however, the longitudinally movable trailing axle tends to turn clockwise to an increased angle relative to the track center line due to the force couple of the longitudinally directed forces $F_{s_3}$ acting upon the movably mounted axle. As a result of the increased clockwise twisting of the movably mounted trailing axle, laterally directed slippage forces $F_{l_3}$ are set up between the rails and the trailing axles which forces produce counterclockwise turning moments about a vertical axis through the leading axle. These counterclockwise turning moments of the lateral slippage forces about the axis through the leading axle tend to oppose and counteract the clockwise turning moments produced by the longitudinally directed slippage forces $F_{s_3}$. Accordingly, by providing for longitudinal movement of the trailing axle relative to the side frames it is possible to reduce and prevent development of lateral oscillations at the trailing portion of a truck and thus prevent truck nosing. It is obvious that by proper design of the axle mountings the angularity of the longitudinally movable trailing axle may be made sufficient to develop laterally directed slippage forces $F_{l_3}$ that will completely counteract and overbalance the turning moments of the longitudinally extending slippage forces $Fs_3$ and thus cause the trailing portion of the truck, as well as the trailing axle, to positively return to its normally central position relative to the rails.

The action of the lateral slippage forces $Fl_3$ can be likened to the rudder steering of a boat where the turning of the rudder in one direction turns the boat in the opposite direction. In the same manner it is possible for a longitudinally movable trailing axle of a car truck to maintain the directional stability of the truck. Longitudinal freedom of movement of the leading axle is of no apparent importance when the truck is traveling forwardly since the leading axle merely tends to increase the restoring moment of that axle in the same manner as shown in connection with the rigidly mounted axle of Fig. 1. As trucks have to be moved forwardly from either end it is obvious that both axles must be free for longitudinal movement in the commercial embodiment of this invention.

Mathematically, the minimum required longitudinal movement for a wheel axle relative to its supporting frame member, in order to counteract any nosing tendency of the truck, can be expressed as follows:

$$x = \frac{\lambda a s}{L r} y$$

Where $x$ = Required longitudinal movement of side frame journal opening about center of axle.
$y$ = Lateral displacement of trailing wheels about center of leading axle.
$\lambda$ = Tangent of wheel tread cone angle.
$a$ = One-half wheel tread spacing.
$s$ = One-half side frame spacing.
$L$ = Wheelbase.
$r$ = Wheel radius.

Figure 4:
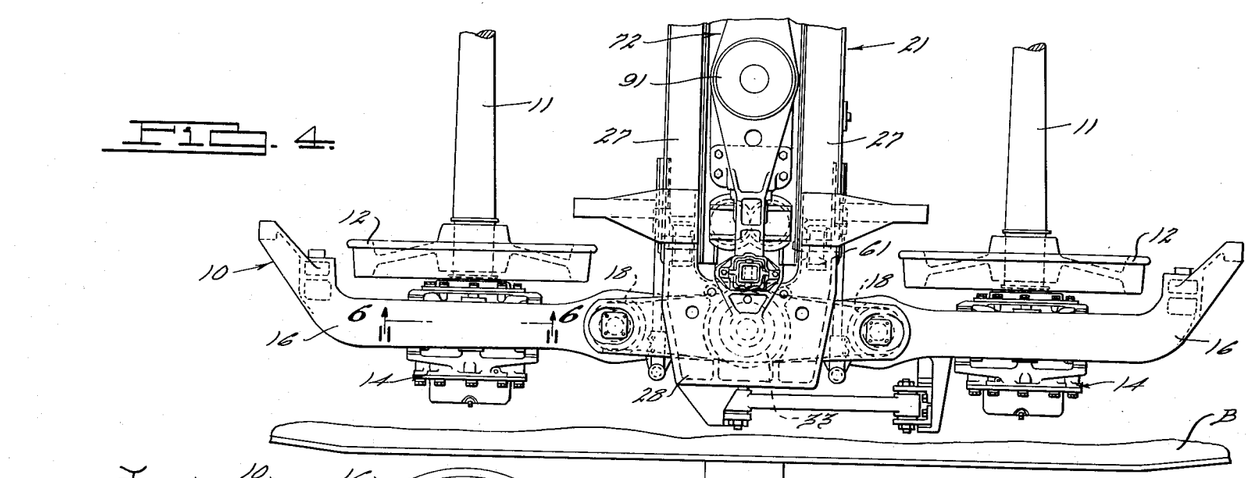
Fig. 4 is a half plan view of a car truck embodying this invention.
Figure 5:
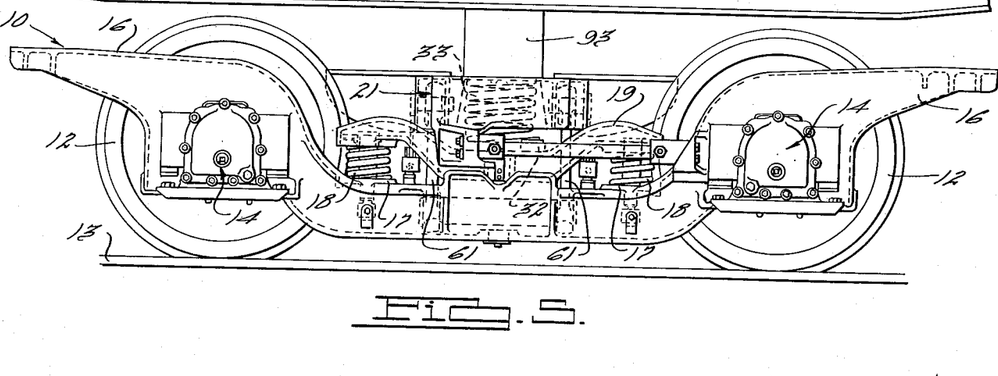
Fig. 5 is a side elevation of the car truck shown in Fig. 4 including a portion of the car body mounted thereon.

Referring now to Figs. 4 and 5 of the drawings it will be noted that the car body B is supported by a truck 10 comprising transversely spaced side frames 16 mounted on a pair of longitudinally spaced, transversely extending axles 11. Each axle 11 carries a pair of coned tread wheels 12 which engage the conventional track rails 13. The protruding ends of each axle 11 are journaled in wheel axle bearing assemblies 14 which assemblies are clearly shown in Figs. 6 and 7 and will be subsequently described in detail. The bearing assemblies 14 are mounted in inverted U-shaped journal openings 15 (see Fig. 6) in the ends of the side frames 16. The mounting of the bearing assemblies 14 in the side frame journal opening 15 is such as to provide a "pedestalless" type connection wherein the axles and bearing assemblies are precluded from vertical movement with respect to the side frames. As will be subsequently pointed out the bearing assemblies 14 and axles 11 are mounted in the side frame journal openings 15 so as to permit limited, positively controlled, longitudinal movement of the axles relative to the side frames within the clearance space between the inner walls of the journal openings and the outer walls of the bearing assemblies.

Each of the side frames 16 has a depressed middle section provided with longitudinally spaced seats 17 on which are mounted coil springs 18 through which the car load is resiliently applied to the side frame members. The springs 18 in turn support the end portions of the longitudinally extending beam members 19 which also form a part of the load supporting system. Beams 19 are arranged so as to support another load carrying structure, namely, the transom frame 21. This transom frame 21 comprises spaced members 27 extending transversely of the truck, which members are joined at their ends by curved sections 28 which overlie the central portions of the beams 19. The curved sections 28 are formed with spring receiving seats which are vertically aligned with the complementary seats 32 on the beams 19. These aligned seats have mounted therebetween the nested coil springs 33. The springs 33 transmit the load of the transom frame 21 to the beams 19 and at the same time cushion the supported car against impacts or shocks transmitted from the wheels to the beams 19.

Transom frame 21 pivotally supports the truck bolster member 72 by means of swing hanger assemblies 61 which assemblies permit limited transverse swinging movement of the truck bolster relative to the transom frame. Swing hanger assemblies 61 form no part of this invention and therefore the details of these assemblies have been purposely omitted. These swing hanger constructions are clearly shown in the patent application of Robert N. Janeway, Serial No. 496,998 filed August 2, 1943, which has matured into Patent No. 2,578,554.

The central portion of the truck bolster 72 is formed with a conventional bearing member 91 which receives a complementary bearing portion carried by the car body bolster 93. The bearing connections between the car bolsters and truck bolsters permit relative turning movement between the car body and supporting truck units.

It is now thought to be obvious how the load of the car B and its contents is transferred from the car bolster 93 to the truck bolster 72 and then through the swing hanger assemblies 61 to the transom frame 21. The transom frame 21 rests upon the springs 33 which are supported on the beams 19. Beams 19 transmit the car load to the side frame members 16 through the springs 18. The side frame members 16 are supported at each end on the wheel bearing assemblies 14 which are mounted on the ends of the axles 11. The manner of mounting the side frames 16 on the wheel bearing assemblies 14, so as to provide for positively controlled longitudinal movement between these engaged elements will now be described.

Figure 6:
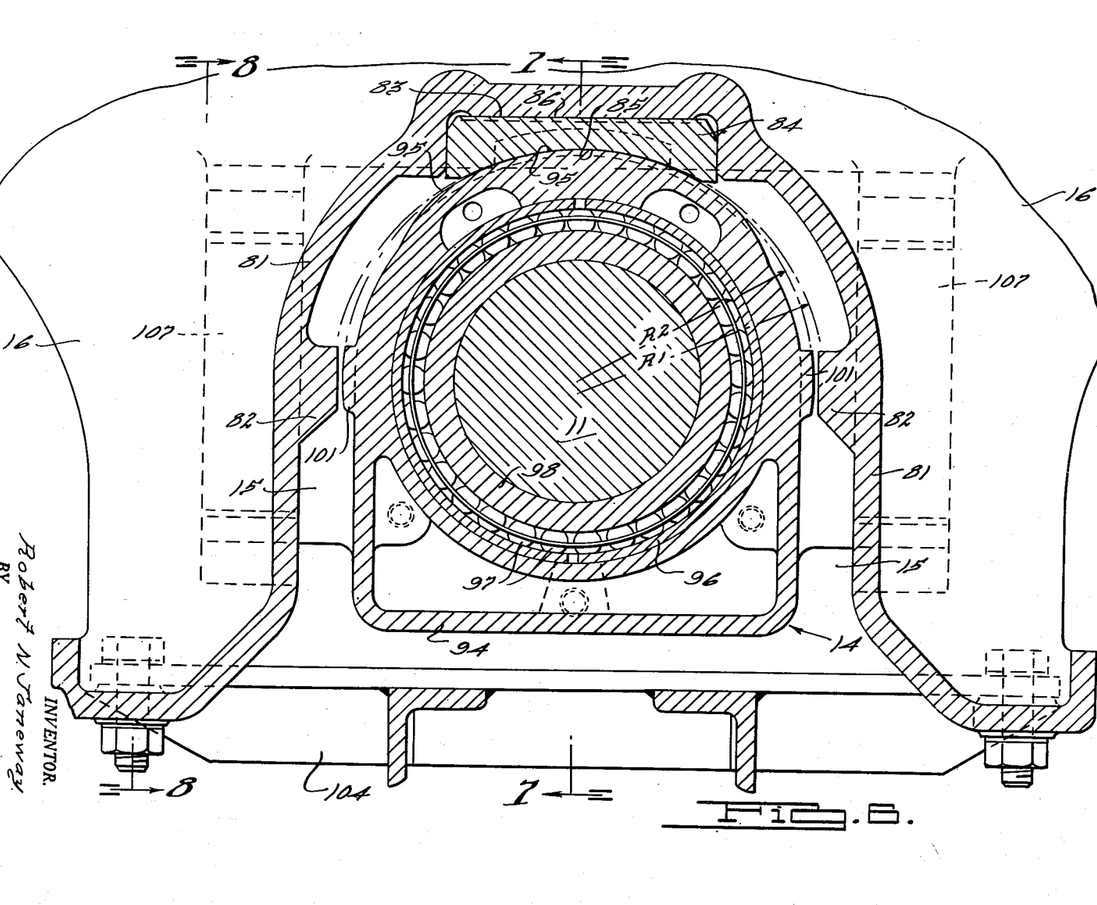
Fig. 6 is an enlarged vertical sectional view taken along the lines 6—6 of Fig. 4.

Referring to Fig. 6 it will be observed that the inverted U-shaped journal opening 15 in the side frame member 16 is of such a size and shape that the side frame is seated on but fits loosely about the bearing assembly 14. Each side frame journal opening 15 is bounded by a wall portion 81 from which lugs 82 project inwardly toward the outer sides of the bearing assembly 14. A seat portion 83 is formed in the curved bight portion of the U-shaped wall 81, which seat portion receives the rigid bearing assembly rocker block 84. The members 104 extend across the mouth of the U-shaped opening 15 to retain the bearing assembly within the opening 15.

Each journal bearing assembly 14 comprises an outer housing 94 within which are concentrically mounted the outer roller bearing race 96, a set of tapered roller bearings 97, and the inner roller bearing race 98 which is secured to and rotatable with the wheel axle 11. The housing 94 is closed at its outer end by means of an end plate 99 (see Fig. 7) bolted thereto. Housing 94 is adapted to contain oil or some other liquid lubricant so that the rollers 97 of the bearing assembly are constantly supplied with lubricant. Each bearing assembly housing 94 is shaped to fit loosely within the U-shaped side frame journal opening 15 and is provided along its sides with outwardly projecting lugs 101 which lugs are spaced from but aligned with the lugs 82 projecting from the walls 81 of the side frame journal openings 15. Due to the space between the lugs 82 and 101, it is obvious that the axles 11 and the bearing assemblies 14 can move longitudinally relative to the side frame 16. The top wall portion 95 of each bearing assembly housing 94 has an outer convexly curved bearing surface 95 of such a radius of curvature that the housing 94 may rock longitudinally within the concavely curved bight portion of the side frame journal opening 15. The longitudinal movement of the axles and bearing assemblies relative to the side frame members is really a rolling of the bearing assembly housings 94 along the inner surfaces 85 of the side frame journal opening rocker blocks 84. The line contact between the engaged surfaces 85, 95 permits this rolling action. It will be noted from Fig. 6 that the radius of curvature R1 of the inner face 85 of the rocker block 84 is larger than the radius of curvature R2 of the outer face 95 of the curved bearing surface on the housing 94. Due to this difference in the radii of curvature of these engageable portions of the bearing assembly housings and the associated side frame rocker blocks, the axles 11 can move longitudinally with respect to the side frame members. Furthermore, the axles will normally tend to return to their centered, aligned positions due to the self-centering action of the curved bearing surfaces 95 rolling on the curved rocker block journal surfaces 85. Thus, not only does this bearing assembly permit longitudinal movement of the axles, but it also automatically centers the axles in their normally aligned positions. As a result of the specific arrangement herein disclosed, whereby a predetermined longitudinal movement of the bearing assembly is possible, the engaged, concentrically arranged, curved bearing and journal surfaces provide a gravity spring device which positively controls the movement of the wheel axles within the journal openings. It is obvious that the load of the car is a downwardly directed, vertically extending, load normally passing through the longitudinal center of the side frame journal openings and the center of the axles. If the slippage forces set up at the truck wheel contacts with the rails are of such magnitude that the axles are twisted about vertically extending axes so as to move longitudinally within the journal openings in the side frames, then the longitudinal movement of the axles necessitates a lifting of the car load applied at the journal openings. Accordingly, the car load tends to resist any longitudinal movement of the axles and the axles move only enough to establish a condition of equilibrium between the various forces acting thereon. As the longitudinal slippage forces $F_{S3}$ acting on the wheels are counteracted by the lateral slippage forces $Fl_3$ resulting from angular displacement of the axle, the wheels return to their normally central positions relative to the rails, the longitudinal slippage forces are dissipated, and then the gravity action of the car load automatically forces the axles back to their normal positions in the center of the rocker block bearing seats 85. It is to be understood that the operation of the various forces herein described is practically simultaneous but for the purpose of description and sake of clarity the various actions and reactions have been described as step-by-step processes that compensate for the lateral displacements of the axles, nullify any nosing tendencies of the truck, and automatically center the axles.

The construction herein disclosed provides for positively controlled, longitudinal movement of the axles in the side frame journal openings to counteract nosing. This movement is quite different from that resulting from the loose, uncontrolled movement in the clearance space between the axles and the surrounding side frame journal openings of a conventional axle mounting. The loose fitting conventional axle member fails to provide the required self-centering action and it offers no resistance, except shear in the springs or other resilient elements, to longitudinal movement of the axles under the influence of the various slippage forces. Furthermore, by the use of rigid load supporting rocker blocks, in place of some form of resilient load supporting elements such as are now used in conventional axle assemblies, the bearing assemblies have been simplified as well as improved. This is due to the elimination of the resilient load supporting elements that tend to set up high frequency vibrational disturbances in the side frames, which disturbances become extremely objectionable and detract from the truck riding qualities. Furthermore, resilient load supporting elements will not withstand wear as well as the rigid rocker block assembly herein disclosed.

Figure 7:
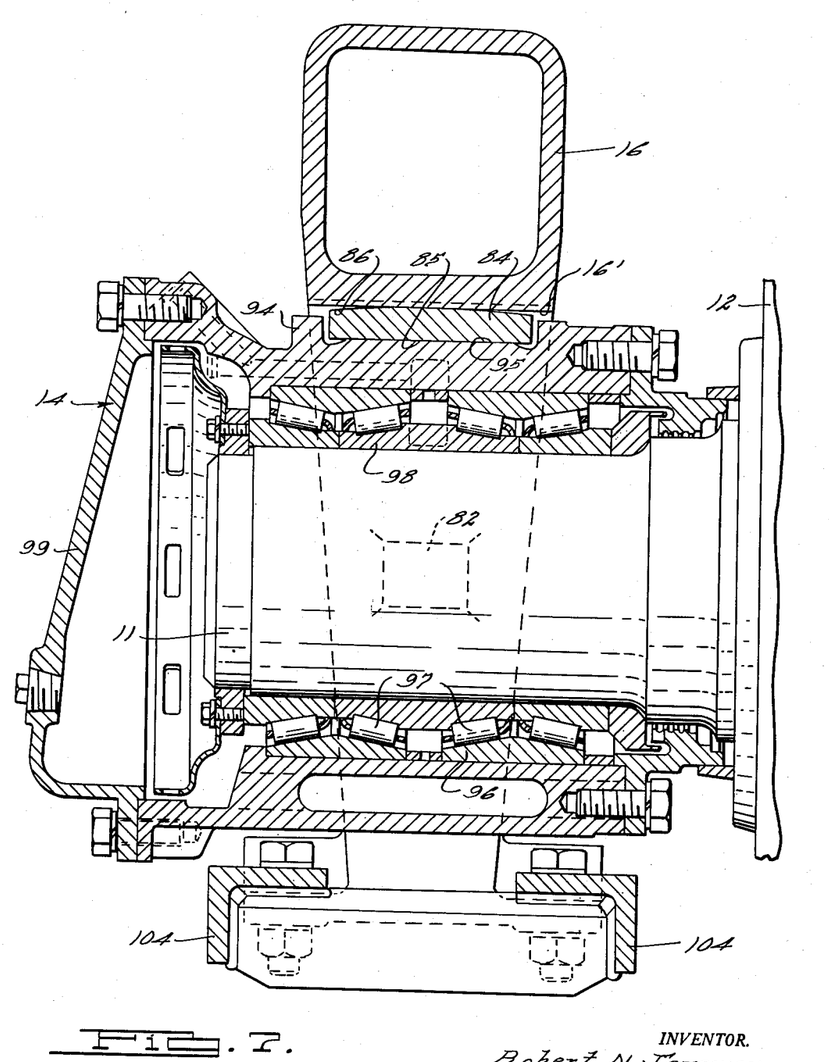
Fig. 7 is an enlarged sectional elevation taken along the lines 7—7 of Fig. 6.
Figure 8:
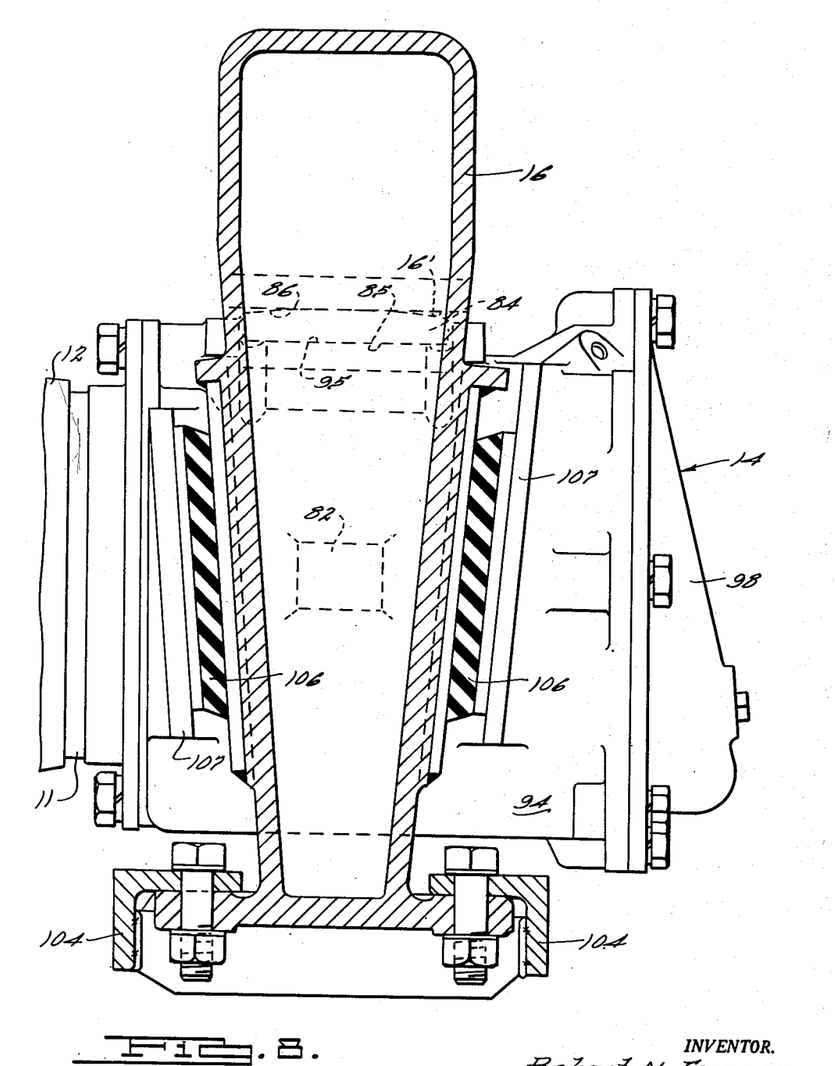
Fig. 8 is an enlarged sectional elevation taken along the lines 8—8 of Fig. 6.

Rocker blocks 84, in addition to providing the journal surface for the bearing assembly housings 94, also provide a bearing surface for the wall portions 16' of the associated side frame journal openings. Referring to Figs. 7 and 8 it will be noted that outer face 86 of the rocker block 84 is convexly curved transversely of the block so as to form a curved seat for the wall portion 16' of the side frame member supported thereon.

The transversely extending, upwardly arched, rocker block bearing surfaces 86 provide the necessary freedom of movement between the side frames 16 and the bearing assemblies 14 in order to permit relative vertical movement between the various wheels of the truck unit. Resilient means, in the form of rubber wedge blocks 106, are provided to restrain unnecessary transverse rocking of the side frames 16 on the curved bearing surfaces 86 of the rocker blocks 84. The wedge blocks 106 are positioned between the longitudinally extending sides of the side frame members 16 and adjacent, longitudinally extending flanges 107 projecting from the bearing assembly housings 94. Wedge blocks 106 are precompressed and placed in shear during assembly of the truck unit but these members do not resiliently support the car load for the car load rides on the rocker blocks 84. Flanges 107 project from the housings 94 on each side of the journal openings in the side frames and adjacent each longitudinal side of the side frames. It will be seen that the wedge blocks 106 not only resiliently restrain transverse rocking of the side frames 16 on the curved surfaces 86 of the rocker blocks 84 but they are also placed in shear by any longitudinal movements of the axles relative to the side frames therefor the wedge blocks 106 tend to resist longitudinal shifts of the axles and assist in centering the axles when the nose producing forces have been dissipated. Thus, not only does the gravity action rocker block device resist shift of the axles and automatically center the axles, but, in addition the resilient blocks 106 supplement each of these functions. The blocks 106 accomplish these functions without resiliently supporting any of the car load. The wedge blocks 106 also resist unsquaring of the side frames for such movements of the side frames, as when one frame moves longitudinally relative to the other, causes a deformation of the wedge blocks by the flanges 107. The deformation of the wedge blocks 106 during unsquaring action tends to resist such action and furthermore the resilient blocks will tend to automatically realign the side frame members when the unsquaring forces have been overcome. The function of the rubber wedge members 106 may be said to be primary as to resiliently aligning the side frames and as to equalizing the effects of relative movement between the truck wheels, and secondary as to counteracting nosing.

Due to the specific means which I have designed for mounting the side frame members on the wheel axle bearing assemblies an effective, simplified method of combating truck nosing has been provided and at the same time the general riding qualities of the truck have been materially improved.

I claim:

1. A railway truck axle mounting comprising a side frame member provided with a transversely extending, axle receiving, journal opening having a concavely curved, longitudinally extending, downwardly facing, cylindrically formed, journal surface, and an axle provided with a bearing assembly including a convexly curved, upwardly facing, cylindrically formed, bearing surface disposed within and engageable with the concavely curved journal surface of the frame member journal opening, the radius of curvature of the convexly curved bearing surface being less than that of the concavely curved journal surface whereby said axle and bearing assembly may roll longitudinally of the side frame journal opening under the positive control of the load of the side frame applied to the engaged cylindrical surfaces, which load provides an equilibrium stabilizing force that resists displacement of the axle, and pre-compressed resilient means mounted between transversely spaced apart portions of said side frame and said bearing assembly adapted to elastically resist longitudinal and transverse movement of said axle relative to the side frame journal opening.

2. In a railway truck having a frame and a frame supporting axle, means for mounting the axle in the frame comprising a rigid, load-carrying, bearing journal member carried by said frame having a downwardly directed, longitudinally extending, concavely curved, journal surface of straight line cross sectional contour, and a bearing member carried by said axle having an upwardly directed, longitudinally extending, convexly curved, bearing surface of straight line cross sectional configuration disposed in concentrically arranged engagement with the curved journal surface, the radius of curvature of the frame journal surface being greater than the radius of curvature of the axle bearing surface thereby permitting relative rolling therebetween whereby the axle may have predetermined longitudinal movement relative to the frame member which movement is resisted by the load of the frame applied to the concentrically engaged, curved, surfaces so as to provide means tending to restore the axle to its position of stable equilibrium, said rigid load-carrying member including an upwardly presenting, convexly curved, transversely extending, bearing surface adapted to rockably support the frame member for transverse oscillatory movement.

3. In a railway truck having a frame and an axle, means for mounting the axle in the frame to support same for a predetermined movement relative thereto comprising a rigid, load-carrying member carried by said frame having a downwardly presenting, longitudinally extending, concavely curved, journal surface of straight line transverse cross sectional configuration, and a bearing member carried by said axle having an upwardly directed, longitudinally extending, convexly curved, bearing surface of straight line cross sectional configuration disposed in concentrically arranged engagement with the curved journal surface, the curvatures of the journal surface and bearing surface being such that the axle bearing member may roll on the journal surface of the rigid load carrying member and the axle may have a predetermined longitudinal and vertical movement relative to the frame member that is opposed by the load of the said frame applied to the axle through the engaged curved surfaces, said rigid load-carrying member including an upwardly presenting, convexly curved, bearing surface adapted to rockably support the frame member for transverse oscillatory movement, and resilient wedge means disposed between longitudinally extending, spaced apart portions of said bearing member and said frame to elastically restrain movement of said frame relative to said bearing member.

4. In a railway car truck, a pair of laterally spaced side frames having transverse, downwardly facing, longitudinally extending, cylindrically formed, concavely curved wheel axle journal openings adjacent each end thereof, a transversely extending wheel axle connected between the openings at each end of said frame, bearing assemblies carried by each end of the axles mounting the wheel axles in the journal openings, each assembly comprising a housing surrounding the wheel axle and roller bearing means disposed between the housing and the axle, each housing including an upwardly facing, longitudinally extending, cylindrically formed, convexly curved, side frame supporting portion concentrically arranged within and engageable with a curved portion of the associated side frame journal opening, the radius of curvature of said curved surface of the bearing assembly housing being less than the radius of curvature of the associated side frame journal opening so as to permit said housing and axle to roll longitudinally of the side frame journal opening under control of the engaged cylindrical surfaces which provide an equilibrium stabilizing device that permits the load of the side frames to resist longitudinal movement of the axle and to restore the axle to its normal position, and resilient means interposed between each side frame and each axle arranged to resist the relative longitudinal and vertical movement of the side frames with respect to the axles when rolling occurs between the concentrically engaged curved surfaces.

5. In a railway car truck, a side frame member provided with a wheel axle journal opening, a bearing assembly positioned within said journal opening comprising an axle and a surrounding housing provided with a longitudinally extending curved bearing surface, a rigid rocker block supported between the wall of said journal opening and the bearing surface on said housing, said rocker block having a longitudinally extending curved journal surface engageable with the longitudinally extending curved bearing surface on said housing, the radius of curvature of the curved bearing surface on said housing being less than the radius of curvature of the curved journal surface on the wall of the journal opening engageable therewith, whereby said bearing assembly has a line contact with the journal surface of the side frame journal opening such that it may roll relative thereto and said axle has a positively controlled longitudinal and vertical movement relative to the side frame, said rocker block including a transversely extending curved surface engageable with the wall of said journal opening whereby said frame member may rock transversely relative to said axle, and precompressed resilient means arranged between longitudinally extending, spaced apart portions of said frame member and said bearing assembly elastically resisting relative movement between said frame member and said bearing assembly.

6. In a railway car truck, a side frame member provided with a wheel axle journal opening, a bearing assembly comprising an axle and a surrounding housing positioned within said journal opening, a rigid rocker block supported between the wall of said journal opening and the outer side of said housing, said rocker block including a downwardly facing, longitudinally extending, cylindrically curved journal surface, a cylindrically curved upwardly facing bearing surface on the outer side of said housing concentrically mounted within and engageable with the downwardly facing curved journal surface on the rocker block by line contact, the radius of curvature of the curved bearing surface on said housing being less than the radius of curvature of the curved journal surface on the rocker block engageable therewith whereby said bearing assembly and axle may roll relative to each other and said axle may have limited longitudinal movement relative to the side frame, the load of the side frame member applied to the axle through the engaged curved surfaces opposing movement of the axle and providing a restoring force to return the axle to its normal centered position in the side frame journal opening, said rocker block also including an upwardly facing, transversely extending, curved surface on the side of the block engageable with the wall of the journal opening to provide for transverse rocking of said side frame relative to said housing.

ROBERT N. JANEWAY.

References Cited in the file of this patent

UNITED STATES PATENTS

| Number | Name | Date |
|---|---|---|
| Re. 15,599 | Cite | May 15, 1923 |
| 746,370 | Peckham | Dec. 8, 1903 |
| 1,290,511 | Cite | Jan. 7, 1919 |
| 2,051,646 | Oelkers | Aug. 18, 1936 |
| 2,410,402 | Ledwinka | Nov. 5, 1946 |

FOREIGN PATENTS

| Number | Country | Date |
|---|---|---|
| 9,832 | Norway | Dec. 21, 1900 |